United States Patent

Schroder et al.

[11] 3,916,841
[45] Nov. 4, 1975

[54] STEAM GENERATOR FOR A PRESSURIZED-WATER COOLANT NUCLEAR REACTOR

[75] Inventors: Heinz-Jürgen Schröder; Wolfgang Berger, both of Erlangen, Germany

[73] Assignee: Siemens Aktiengesellschaft, Munich, Germany

[22] Filed: Dec. 14, 1973

[21] Appl. No.: 424,691

[30] Foreign Application Priority Data
Dec. 22, 1972 Germany............................ 2263165

[52] U.S. Cl. ...................... 122/32; 122/34; 122/407
[51] Int. Cl. ............................................. F22b 1/06
[58] Field of Search ................ 122/32, 34, 483, 407

[56] References Cited
UNITED STATES PATENTS

| | | | |
|---|---|---|---|
| 2,336,832 | 12/1943 | Badenhausen......................... | 122/34 |
| 3,139,070 | 6/1964 | Sprague et al.......................... | 122/34 |
| 3,141,445 | 7/1964 | Bell........................................ | 122/34 |
| 3,807,365 | 4/1974 | Lyman et al........................... | 122/483 X |

*Primary Examiner*—Kenneth W. Sprague
*Attorney, Agent, or Firm*—Kenyon & Kenyon Reilly Carr & Chapin

[57] ABSTRACT

A steam generator has a vertical cylindrical housing having a steam output outlet, a horizontal tube sheet closing the lower end of this housing, and an inverted U-shaped tube bundle inside of the housing and having vertical inlet and outlet legs with their ends mounted in the tube sheet. Beneath the tube sheet there are inlet and outlet manifolds for the respective ends of the tube bundle so that pressurized-water coolant from a pressurized-water coolant nuclear reactor can be circulated through the tube bundle. A feed-water preheater encloses the lower end of the bundle's outlet leg and has a feed-water inlet feeding the preheater via a connection from the outside of the housing and a preheated feed-water outlet. A cylindrical shroud peripherally encloses both legs of the tube bundle and the preheater's outlet discharges upwardly into this cylindrical shroud, the latter forming an annular feed-water descent space between it and the generator's housing and its lower end opening to the tube sheet for feed water flow thereover and ascent upwardly through the shroud. A steam-water separator is positioned in the housing above the shroud and has an inlet for receiving a steam-water mixture from the latter, and a steam outlet connecting with the housing's steam output outlet and a separated feed-water outlet connecting with the descent space. An enclosure encloses substantially the full length of the bundle's inlet or hot leg and is connected at its upper end with the separator's steam outlet and at its lower end with the housing's steam output outlet whereby to interconnect these outlets, the steam from the separator being superheated while flowing along the bundle's inlet leg. A second enclosure encloses the length of the tube bundle's outlet or cold leg and connects at its lower portion with the preheated feed-water outlet of the preheater and at its upper end with the steam-water mixture inlet of the water separator. Means are provided for force pumping into the preheater's feed-water inlet, a certain flow of feed-water from the descent space and which mixes with the feed-water fed to the preheater from the outside of the housing.

7 Claims, 2 Drawing Figures

STEAM GENERATOR FOR A PRESSURIZED-WATER COOLANT NUCLEAR REACTOR

BACKGROUND OF THE INVENTION

A typical steam generator for a pressurized-water coolant nuclear reactor has a vertical cylindrical housing having a steam output outlet, a horizontal tube sheet closing the lower end of this housing and in which the inlet and outlet legs of an inverted U-shaped tube bundle are mounted inside of the housing. Beneath the tube sheet inlet and outlet manifolds for the inlet and outlet ends of the tube bundle's legs provide for the circulation of the pressurized-water coolant from the nuclear reactor through the tube bundle. The inlet leg, being the hotter leg, is called the hot leg; the outlet leg, being less hot, is called the cold leg. A feed-water preheater encloses the lower end of the outlet leg, which is the colder leg, this preheater having a feed-water inlet and a preheated feed-water outlet, the latter discharging preheated feed-water upwardly into a cylindrical shroud peripherally enclosing the entire tube bundle and which forms an annular feed-water descent space between it and the inside of the generator's housing. The bottom of the shroud is spaced above the tube sheet and descending feed-water flows radially inwardly over the latter for upward ascent through the shroud while evaporating to generate steam. The housing has an inlet connection for feeding feed-water to the preheater's inlet from a source of supply of feed-water under adequate pressure, on the outside of the housing.

In operation, the externally supplied feed-water is preheated in the feed-water preheater and flows upwardly through the inside of the shroud while generating steam. The top of the shroud connects with the steam-water separator which passes steam to the housing's steam output outlet and discharges separated feed-water into the descent space for descent through the latter and at its bottom end which is spaced above the tube sheet, for inward radial flow over the tube sheet and upwardly through the tube bundle to again ascend through the latter within the shroud.

One example of such a steam generator is disclosed by the U.S. Pat. No. 3,483,848, dated Dec. 16, 1969.

Such a steam generator can be operated more efficiently and economically and produce a higher quality of steam if the steam generated can be superheated prior to its discharge through the generator's steam output outlet. One proposal for such superheating is disclosed by U.S. Pat. No. 3,576,178, dated Apr. 27, 1971, but the construction involved departs radically from the typical construction described above. This departure involves undesirable complications.

The object of the present invention is to provide a construction enjoying the advantages of such superheating but which does not depart substantially from the design of typical steam generators now in use for the development of steam power from the heat of the pressurized-water coolant supplied by a nuclear reactor operating with such a coolant.

SUMMARY OF THE INVENTION

According to this invention, a dividing wall is extended from the inside of the cylindrical shroud through the space necessarily defined between the two legs of the inverted U-shaped heat exchanger of the typical steam generator, thus providing each leg with an individual enclosure. The one of these enclosures which encloses the inlet or hot leg of the tube bundle is connected at its upper end with the steam outlet of the steam-water separator, the generator housing's steam output outlet is positioned in the lower portion of the housing, and the bottom end of this enclosure for the inlet leg is connected with this steam output outlet. Therefore, the bundle's inlet leg is separated from the feed-water in the housing and the steam from the separator is superheated while passing down over the hot leg to the generator's steam output outlet.

Water is discharged from the separator into the descent space. The preheater is built in the bottom of the enclosure for the bundle's outlet leg and the generator housing's feed-water inlet connects with the inlet of this preheater via a jet pump, the supply of incoming feed-water from outside of the housing serving as the primary or powering medium for this jet pump, the latter discharging the externally supplied feed-water primary medium downwardly to the inlet of the heat exchanger in the bottom of the outlet leg's enclosure. The jet pump operates downwardly and the descending feed-water acts as the secondary medium which is sucked or aspirated into the pump's suction inlet and discharges downwardly through its discharge outlet so as to mix with the externally supplied feed-water. In this way, a forced downward circulation of the feed-water in the descent space is effected.

The descent space around the outlet leg's enclosure, being provided in part by the cylindrical shroud, is semicircular in cross-sectional contour. To provide the generator housing with a maximum supply of feed-water and to effect an increased circulation of the feed-water down through the descent space, the housing's external feed-water supply inlet is connected with a semicircular manifold positioned in the semicircular extent of the descent space, and in which a semicircular series of the described jet pumps are positioned, all operating in parallel. The jet pump's secondary medium inlets and outlets open through the top and bottom of this manifold respectively and the discharge of the primary medium or externally fed feed-water is discharged downwardly by the jet pumps through appropriate downward openings in this manifold. The manifold may have other downwardly pointing openings free from the jet pumps and through which the externally supplied feed-water is ejected downwardly, by-passing the jet pumps.

BRIEF DESCRIPTION OF THE DRAWING

A specific example of the invention is schematically illustrated by the accompanying drawing in which.

DETAILED DESCRIPTION OF THE INVENTION

Figure 1:
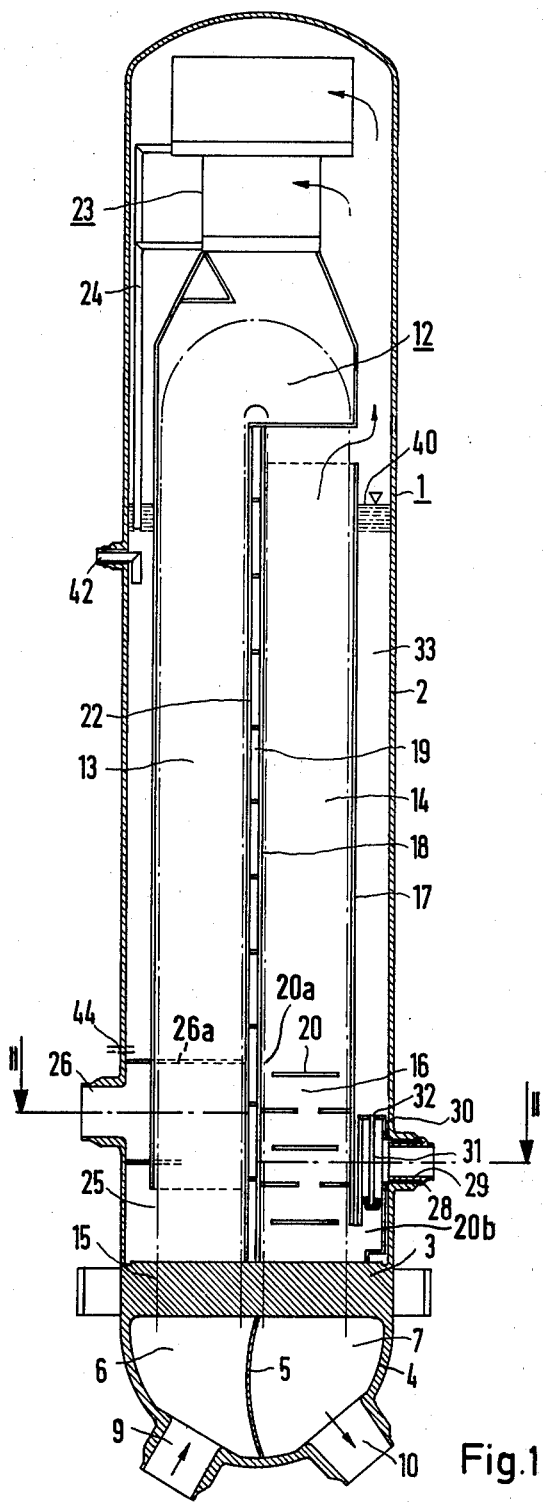
FIG. 1 is a vertical section.
Figure 2:
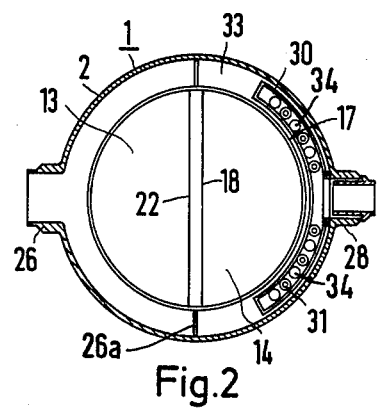
FIG. 2 is a cross section taken on the line II—II in FIG. 1.

Having reference to the above drawing, the illustrated steam generator is generally designated by 1. It is intended for use with a pressurized-water coolant nuclear reactor. The generator has the vertical cylindrical housing 2 with its lower end closed by the tube sheet 3 below which a hemispherical chamber 4 and a transverse vertical partition wall 5 provide the inlet manifold 6 and the outlet manifold 7 for the pressurized-water coolant from the reactor. The manifold 6 has an inlet 9 and the outlet manifold 7 has an outlet 10 from which the pressurized-coolant is drawn by the usual pump (not shown) for return to the reactor from which it came to the inlet 9, the coolant being thus in continuous circulation.

The inverted U-shaped tube bundle 12 through which the coolant circulates is indicated by broken lines, being of the usual construction, its ends being mounted in the tube sheet 3 so that its vertical inlet, or hot, leg 13 connects with the inlet manifold 6 and its outlet, or cold, leg 14, connects with the manifold 7. Both legs are of equal length and tube number, and the legs are linear and parallel to each other. In all instances, the tubes communicate with the manifolds through the tube sheet 3 as indicated at 15. Each leg is of approximately semicylindrical cross section, as represented by the multiplicity of individual tubes, the flat sides of these shapes facing each other and being necessarily interspaced because of the top bend of the U-shape.

The feed-water preheater is shown at 16 built into the bottom of the cylindrical shroud 17 which encloses both legs of the tube bundle. However, in this instance the shroud 17 has a partition wall 18 which extends through the space 19 between the tube bundle legs so that the outlet leg 14 is provided with an individual enclosure which includes the preheater. This partition 18 extends from the top of the tube sheet 3 upwardly to the top of the shroud 17, where the enclosure formed by the latter and the partition 18, is open. The bottom end of the shroud 17 below the heat exchanger 16 is spaced above the tube sheet 3. The preheater is formed by horizontal baffles 20 deflecting the flow sinuously through the tubes. The top baffle defines the outlet 20a and the space below the shroud defines the inlet 20b. It is to be understood that as in U.S. Pat. No. 3,483,848, the preheater comprises the series of horizontal baffle plates 20 through which the tubes of the tube bundle's outlet leg extend, feed-water entering through the inlet 20b being sinuously deflected back and forth around these tubes while flowing upwardly.

A partition 22 extending transversely across the shroud 17 for its length, provides the inlet or hot let 13 with its own individual enclosure and the top of this leg is connected with the steam outlet of the water-steam separator 23 positioned in the top of the housing 2 above the shroud 17. The connection is such that all of the steam from the separator enters the top of the enclosure around the inlet or hot leg 13 of the tube bundle. The water separated from the steam by the separator via a piping 24 goes to the descent space formed between the outside of the shroud 17 and the inside of the housing 13.

The lower end of the enclosure for the inlet leg formed by the shroud 17 and partition 22 opens via a space 25 to the steam output outlet connection 26 of the steam generator in the lower part of the housing 2. The steam is confined by partitions 26a to prevent its escape into the space between the outside of the shroud 17 and the inside of the housing 2.

The external feed-water supply connection for the housing 2 is shown at 28 as being provided with a cylindrical heat shield 29 which opens into the previously referred to arcuate manifold 20. This manifold, supplied via the heat shield 29, extends horizontally in both directions arcuately in the space provided between the shroud 17 and the inside of the housing 2. The incoming feed-water under its pressure supplied by an external pumping system (not shown) enters the manifold and is projected downwardly through openings in its bottom which surround vertical tubes 31 having inlets 32 through which the descending feed-water in the descent space 33 can enter for jet ejection or aspiration downwardly through the bottoms of these tubes 31. In this way jet pumps are formed. There are three of these jet pumps in each wing of the manifold 30, or six downwardly pointing jet pumps in all. In addition, the manifold in the bottom of each of its wings has three downwardly pointing openings 34 down through which the incoming externally supplied feed-water can directly flow, bypassing the jet pumps. In the action of these jet pumps the externally pressurized feed-water act as the primary medium while the downwardly jetted or aspirated feed-water from the descent space 33 functions as the secondary medium.

In operation, externally supplied feed-water forced into the manifold 30 flows downwardly while powering the jet pumps which draw feed-water downwardly from the descent space 33, providing a forced flow of feed-water comprising to a larger extent the externally supplied feed-water and to a smaller extent feed-water already in the descent space 33. This forced flow is downward and goes into the inlet 20b of the heat exchanger 20, the water transversely deflecting back and forth while flowing upwardly between and around the tubes of the outlet or cold leg 14 of the tube bundle 12. The preheated water leaving the preheater's outlet 20a flows upwardly through the enclosure formed around the leg 14 by the partition 18 and the partitioned portion of the shroud 17. A mixture of steam and feed-water leaves the top of this enclosure and goes through the steam-water separator 23, the separated feed-water via the pipes 24 being returned to the descent space 33 for recirculation. Steam from the separator 23 goes downwardly around the inlet or hot leg 13 of the tube bundle through the enclosure formed by the partition 22 and this partitioned section of the shroud 17. While passing downwardly along and through this hot leg, the steam is preheated so as to increase its quality and effectiveness as a power medium. At the bottom of this enclosure for the hot leg 13, the steam travels over the hottest portion of the tube sheet 15 and inlet leg 13 and upwardly and out through the steam output outlet 26, confined by the partitions 26a against escape into the space 33.

The precise level 20 of the feed-water in the descent space 33 can be controlled by an auxiliary feed-water line 42 which leads from outside of the housing 2 into the descent space 33. However, the quantity of feed-water consumed by the generator, such as about 90% by volume, is fed to the generator via the feed-water inlet 28–29 so as to initially pass through the preheater 20. The purpose of the inlet 42 is primarily to maintain the desired exact level of the feed-water in the descent space 33 which would otherwise be dependent entirely on the water discharged to the space 33 via the pipes 24 from the separator 23.

At 44 an elutriating line is shown, this being positioned through the housing 2 and opening from the space 33 at a level above the manifold 30 but close to this level. This blowdown line 44 serves to remove a small portion of the feed-water descending in the descent space 33 and which may be high in corrosion-promotion products. The removal of this small amount can be compensated for by means of the inlet 42, if necessary.

What is claimed is:

1. A steam generator for a pressurized-water coolant nuclear reactor, said generator having a vertical substantially cylindrical housing having a steam output outlet, a horizontal tube sheet closing the lower end of said housing, an inverted U-shaped tube bundle inside of said housing and having vertical inlet and outlet legs with their ends mounted in said tube sheet with the latter having therebeneath inlet and outlet manifolds for said ends respectively, a feed-water preheater enclosing the lower end of said outlet leg and having a feed-water inlet and a preheated feed-water outlet, said housing having an externally supplied feed-water inlet connecting with said preheater's inlet, a cylindrical shroud peripherally enclosing said tube bundle and into which said preheater's outlet discharges upwardly, said shroud forming an annular feed-water descent space between it and said housing and opening to said tube sheet for feed-water ascent through said shroud, and a steam-water separator positioned in said housing above said shroud and having an inlet for receiving a steam-water mixture therefrom and having a steam outlet connecting with said steam output outlet and a separated feedwater outlet connecting with said descent space; wherein the improvement comprises means for individually enclosing said inlet leg with an upper end connected with said separator's steam outlet and a lower end connected with said steam output outlet, means for individually enclosing said outlet leg with a lower portion connected with said preheated feed-water outlet of the preheater and at an upper end connected with said steam-water mixture inlet of the water separator, and means for pumping downwardly to said preheater's feed-water inlet a flow of feed-water from said descent space.

2. The steam generator of claim 1 in which said feed-water inlet feeding said preheater provides a larger flow of feed-water thereto and said pumping means supplies a smaller flow of feed-water thereto as these last-mentioned flows are related to each other.

3. The steam generator of claim 2 in which said housing has an additional feed-water inlet for maintaining feed-water in said descent space at a reserve level substantially above said feed-water pumping means, the latter and the preheater and the latter's said feed-water inlet being in the lower portion of said vertical housing.

4. The steam generator of claim 1 in which said pumping means comprises at least one jet pump having a primary jet flow passage interposed between said preheater and said externally supplied feed-water inlet, and a secondary flow passage connecting said descent space with said preheater, the latter and said pump and the preheater's said feed-water inlet being positioned in the lower portion of said housing.

5. The steam generator of claim 4 in which said descent space is semicircular adjacent to said jet pump and a semicircular series of said pumps are positioned in this semicircular space.

6. The steam generator of claim 5 in which said series of jet pumps all have primary passages and a manifold interconnecting the latter and said externally supplied feed-water inlet, said manifold having downwardly extending openings by-passing the primary passages of said jet pumps.

7. The generator of claim 1 in which said housing has an elutriating pipe opening from said descent space at a level above said pumping means.

* * * * *